United States Patent
Rinklake et al.

[11] Patent Number: 6,105,331
[45] Date of Patent: Aug. 22, 2000

[54] JOIST ELEMENT FOR FASTENING A FLAT, PLATE-SHAPED STRUCTURAL ELEMENT TO A PITCHED ROOF

[75] Inventors: Manfred Rinklake, Gross-Umstadt; Norbert Rösler, Oberursel, both of Germany

[73] Assignee: BRAAS GmbH, Oberursel, Germany

[21] Appl. No.: 09/163,894

[22] Filed: Sep. 29, 1998

Related U.S. Application Data

[63] Continuation-in-part of application No. PCT/DE97/00646, Mar. 27, 1997.

[30] Foreign Application Priority Data

Mar. 29, 1996 [DE] Germany .................... 196 12 488

[51] Int. Cl.[7] ..................................................... E04D 1/36
[52] U.S. Cl. .......................... 52/650.1; 52/550; 52/726.1; 52/733.3
[58] Field of Search .................... 52/173.3, 478, 52/518, 543, 544, 547, 549, 550, 551, 552, 650.1, 726.1, 726.2, 731.1, 733.3, 739.1, 740.6; 136/244; 248/222.11, 222.12, 237

[56] References Cited

U.S. PATENT DOCUMENTS

| | | | |
|---|---|---|---|
| 3,300,934 | 1/1967 | Waizenhofer | 52/478 X |
| 3,373,534 | 3/1968 | Berridge | 52/550 X |
| 3,380,214 | 4/1968 | Stevens | 52/550 X |
| 3,434,260 | 3/1969 | Carter | 52/550 X |
| 3,778,952 | 12/1973 | Soucy | 52/733.3 X |
| 4,677,248 | 6/1987 | Lacey | 52/173.3 X |
| 5,642,596 | 7/1997 | Waddington | 52/550 X |

FOREIGN PATENT DOCUMENTS

| | | |
|---|---|---|
| 2491112 | 4/1982 | France . |
| 151738 | 1/1903 | Germany . |
| 221279 | 10/1908 | Germany . |
| 9409453 | 9/1994 | Germany . |
| 9424384 | 10/1994 | WIPO . |

Primary Examiner—Richard Chilcot
Attorney, Agent, or Firm—Nils H. Ljungman & Associates

[57] ABSTRACT

A joist element for fastening a flat, plate-shaped structural element to a pitched roof. In particular for fastening a solar energy collection module, whereby the joist element, laid in the ridge-eaves direction, can be fastened to the roof substructure.

18 Claims, 10 Drawing Sheets

JOIST ELEMENT FOR FASTENING A FLAT, PLATE-SHAPED STRUCTURAL ELEMENT TO A PITCHED ROOF

CONTINUING APPLICATION DATA

This application is a Continuation-In-Part application of International Application No. PCT/DE97/00646, filed on Mar. 27, 1997, which claims priority from Fed. Rep. of Germany Patent Application No. 196 12 488.3, filed on Mar. 29, 1996. International Application No. PCT/DE97/00646 was pending as of the filing date of the present U.S. application and the U.S. was an elected state in the International Application No. PCT/DE97/00646.

BACKGROUND OF THE INVENTION

1. Field of the Invention:

This present invention relates to a joist element for fastening a flat, plate-shaped structural element to a pitched roof, in particular for fastening a solar energy collection module, whereby the joist element, laid in the ridge-eaves direction, can be fastened to the roof substructure.

2. Background Information:

Such a system is described in German Patent No. 94 09 453.9 U1, for example. In this system, modules are arranged so that they overlap one another in the longitudinal direction of the roof. In this specification, the longitudinal direction is called the ridge-eaves line, and the transverse direction is designated a line parallel to the ridge or to the eaves. As the joist elements, there are wooden profiles laid in the edge-eaves direction which, on their ridge-side end, are in contact with a roof batten and on their eaves-side end are in contact with a wooden batten that is laid parallel to a roof batten and adjacent to the latter. The wooden batten projects beyond the upper edge of the roof batten by approximately the thickness of the module. The wooden profiles, on their surface, have a depression that runs in the longitudinal center, so that this depression, when located on the edges of two modules butted against one another, serves as a drain channel for the discharge of any water that may have penetrated into the gap. One disadvantage of this system is that additional wooden battens must be laid parallel to the roof battens, and that additional stays that are engaged around the eaves-side edge of the modules are necessary for fastening.

OBJECT OF THE INVENTION

The object of the present invention is to make available a joist element for a flat, plate-shaped structural element, in particular for a solar energy collection module, which structural element, on account of its dimensions, can be used in place of several commercially available small-format roofing plates, so that this structural element can be both integrated into a roof covering that consists of small-format roofing plates, and can also be installed into an existing covered roof without requiring adaptation work.

SUMMARY OF THE INVENTION

The present invention teaches that this object can be accomplished by providing, on the joist element, a lug or support which, when two joist elements are located in the same slope line, supports the adjacent end of the ridge-side joist element on the neighboring eaves-side joist element at a height above the surface of the structural element or module lying on it so that the ridge-side joist element can move longitudinally over the structural element or module.

For the installation of a first structural element or module, at least two joist elements located in a course parallel to the eaves and in lines running essentially parallel to one another in the pitch-eaves direction are necessary. The lowest joist element of a line is fastened to a first roof batten by means of its ridge-side terminal segment, while its eaves-side terminal segment overlaps a neighboring roofing plate in the eaves direction, and is fastened, by means of a stay, for example, to an eaves-side second roof batten. The first module is then placed on the upper side of the lower joist element. The ridge-side joist element to be laid in the same line is connected in the vicinity of its eaves-side terminal segment with the support of the lower joist element, and is laid on the ridge-side on a ridge-side third roof batten. In this case, the ridge-side joist element is supported at a height substantially spaced above the support plane provided by the first joist element so as to be above the upper surface of the first module so that the joist can be moved to adjust it to the respective distance between the roof battens in the eaves direction, without thereby butting up against the first module.

During this displacement, the ridge-side joist element is positioned so that its ridge-side terminal segment can be fastened on one hand to the third roof batten, and on the other hand, so that its eaves-side terminal segment overlaps the first module on the ridge side. The overlapping eaves-side terminal segment of the joist element nearer the ridge thereby prevents the first module from lifting off the joist element underneath. A second module is then placed over two parallel ridge-side joist elements, and overlaps a ridge-side terminal segment of the first module.

On a module that has a length of 38 cm and a width of 120 cm, for example, the transverse distance between the joist elements of a course parallel to the eaves is approximately 60 cm. When a plurality of structural elements are laid in overlapping fashion between the ridge and the eaves, the plurality of joist elements can be located in a single slope line.

The length of a joist element is preferably greater than the length of a structural element or module, and the structural element or module in turn can be longer than the longest coverage length of the neighboring roofing plates.

The lug that transmits the load from the base-side terminal segment of an overlapping joist element to the overlapped joist element can be realized in a particularly stable manner if it is located on the upper side of the overlapped joist element in the vicinity of its ridge-side terminal segment. This terminal segment projects beyond the ridge-side edge of the structural element.

The joist element can be manufactured in the form of a stamped sheet metal part, if the lug is, for example, realized in the form of a separate component. The lug, for example, can be realized in the form of a bracket made out of bent sheet metal, whereby the ends of the legs are firmly connected to the joist element.

No additional stays are necessary if the upper terminal segment of the lugs is realized in the form of a coupling element that can be connected with a corresponding coupling part on the ridge-side joist element to be supported, and so that it can be slidingly displaced in the longitudinal direction, to prevent the joist element nearer the ridge from lifting up.

The fabrication of a joist element with a lug can be particularly simple if, for example, the lug of a lower joist element can be fastened to an upper ridge-side joist element by means of locking connection elements.

A form-fitting and longitudinally movable or slidable connection between the lug and the joist element nearer the ridge can be created, for example, if the joist element, at least in the vicinity of its eaves-side terminal segment, has a longitudinal slot and the lug has a toggle-like extension. The toggle-like extension of a lug has sidewings separated from the main part of the structure by slots which define a neck, the toggle-like extension being such as to project through the slot of the neighboring joist element nearer the ridge with the neck slidingly engaging in the slot. This longitudinally movable coupling prevents the liftoff of the joist element nearer the ridge, but in the longitudinal direction it represents a movable bearing, so that variations in the distances between the roof battens can always be compensated.

An economical realization of the joist element is possible if it is realized in the form of a thin-walled profile, preferably in the form of a hollow profile. Preferable, the joist element over the greater part of its length is realized in the form of a C-section open on the bottom.

The installation of the plate-shaped structural elements is particularly simple if, in relation to the plane of the roof substructure, the height of the upper side of a joist element is at least equal to the height of the water channel of a laterally neighboring roofing plate, so that the edge of a structural element next to the water channel of a roofing plate can be installed so that it overlaps the water channel, and the edge of a structural element that is next to the cover channel of a roofing plate can be installed so that it abuts the cover channel.

Plate-shaped structural elements as well as photovoltaic modules can be made particularly attractive if they are integrated into a pitched roof covered with commercial flat roofing plates made of concrete or clay. Flat roofing plates made of concrete are conventionally 42 cm long, 33 cm wide and 2.2 cm high.

Concrete flat roofing plates typically have a coverage width of 30 cm and, depending on the pitch of the roof, a coverage length of 31 cm to 34 cm. The height of the water channel is 1.2 cm above the lower edge, so that photovoltaic modules approximately 1 cm thick can be laid essentially flush with the upper side of the roofing plates.

The modules can be installed and replaced essentially without the need for tools, if a joist element, on its eaves-side end, has a receptacle that grips the edge of a plate-shaped structural element in the manner of a hook. Preferably, the base of the receptacle, which is realized so that it has approximately the shape of a "U" laid on its side, is higher than the thickness of a structural element inserted into it, so that even in a skewed or warped position of two joist elements supporting the same structural element, essentially no torsional forces will be exerted on the structural element. An elastic or plastic deformable intermediate layer can fill up any spaces in between.

During the installation operations, a structural element or module can be pushed in the direction of the ridge until it contacts the lugs of the joist elements, then laid on the joist elements, and then inserted into the receptacle in the eaves direction, when the distance between the base of the receptacle on the eaves-side end and the lug on the ridge-side end is greater than the length of the plate-shaped structural element by at least the length of the hook of the receptacle. The structural element or module can be removed by reversing the sequence of operations.

Any damage to the underside of the structural element by a fastening element for the windproof fastening of the joist element can be prevented if, on the ridge-side end of the joist element, there is a bearing for a fastening element for the fastening to the roof substructure. If a screw is used as the connecting element, it is recommended that a countersink be provided on the upper side of the joist element to hold the screw head.

The correctly fitting installation of the plate-shaped structural elements is facilitated if, on the ridge-side end of a joist element, on the underside, there is a projection that makes it possible to hang the joist on the roof substructure. This projection acts in a manner that is similar to a hanging lug of a roofing plate, in that it adjusts the joist element in the longitudinal direction with respect to the ridge-side upper edge of the roofing batten. The eaves-side edge of the structural element is held by the receptacle of the joist element. If the distance between the projection and the base of the receptacle is equal to the distance between the suspension lug and the eaves-side edge of a neighboring roofing plate, the result is a geometric position for structural elements, in particular for photovoltaic modules, installed using the joist elements claimed by the invention, that is the same as for the neighboring roofing plates, regardless of the distance between the roofing battens and the actual overlap provided on the roof.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The accompanying drawings illustrate at least one preferred exemplary embodiment of the invention, which is explained in greater detail below, wherein.

DESCRIPTION OF THE PREFERRED EMBODIMENT

Figure 1:
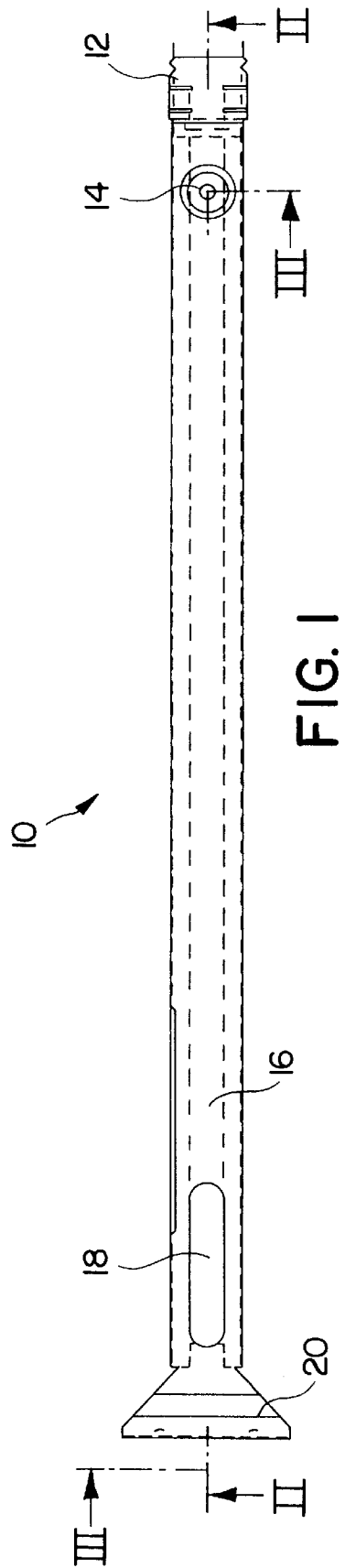
FIG. 1 shows a joist element as claimed by the invention in an overhead view.

FIG. 1 shows a joist element 10 preferably stamped out of stainless steel and bent into the desired shape. On its ridge-side end, there is a lug 12, on which an identical neighboring joist element can be placed. As a bearing 14 for a fastening means for fastening to a roof batten, there is a countersink on the upper side of the joist element 10, in which the head of a screw, for example, can be placed. The joist element 10 is realized over almost its entire length in the form of a C-shape that is open on the bottom, and which has a slot 16 on the underside. In the vicinity of the eaves-side terminal segment, there is a slot 18 on the top, through which the fastening means of a joist element located below it can be reached. On the eaves-side end there is a U-shaped or channel shaped receptacle 20 for a structural element or module. The receptacle 20 is wider than the C-shape of the joist element 10.

Figure 2:
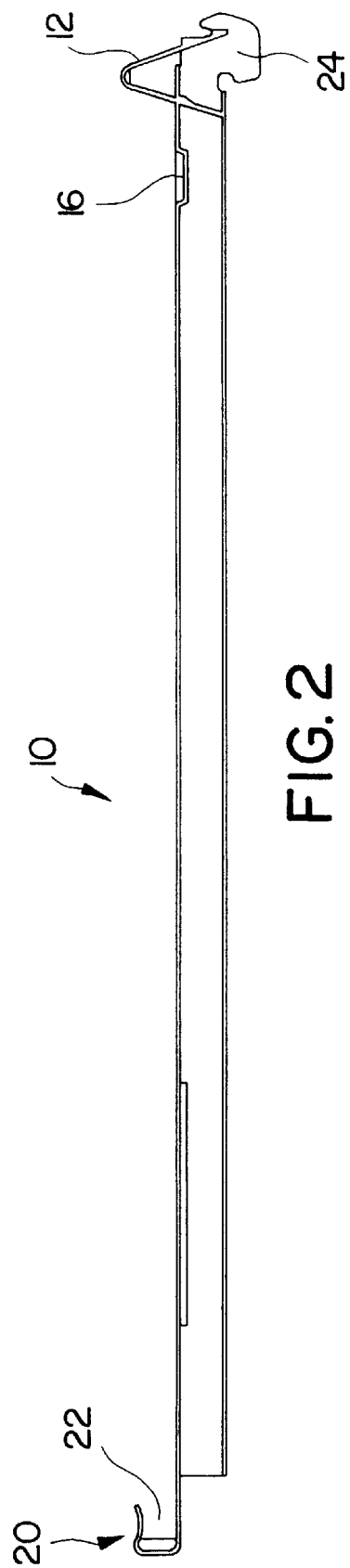
FIG. 2 shows the joist element illustrated in FIG. 1, in a longitudinal section along Line II—II.

FIG. 2 illustrates the arrangement of the lug 12 and the receptacle 20 in longitudinal section. The receptacle 20 projects beyond the C-shaped area of the joist element 10. Consequently, the material can be deformed under the effect of large torsional forces as a result of twisted roof battens, and thus prevent damage to the structural element installed on them. The base of the U-shaped receptacle 20 is lined with a strip 22 which can be made of elastic material. The lug 12 is realized in the form of a bracket made of bent sheet metal, whereby the ends of the legs are fastened to the ridge-side end of the joist element 10. The edge of the bent portion of the lug 12 runs at about a right angle to the longitudinal axis of the joist element 10. Underneath the lug 12, the figure shows a projection 24 which can be hung on a roof batten like the suspension lug of a roofing plate.

Figure 3:
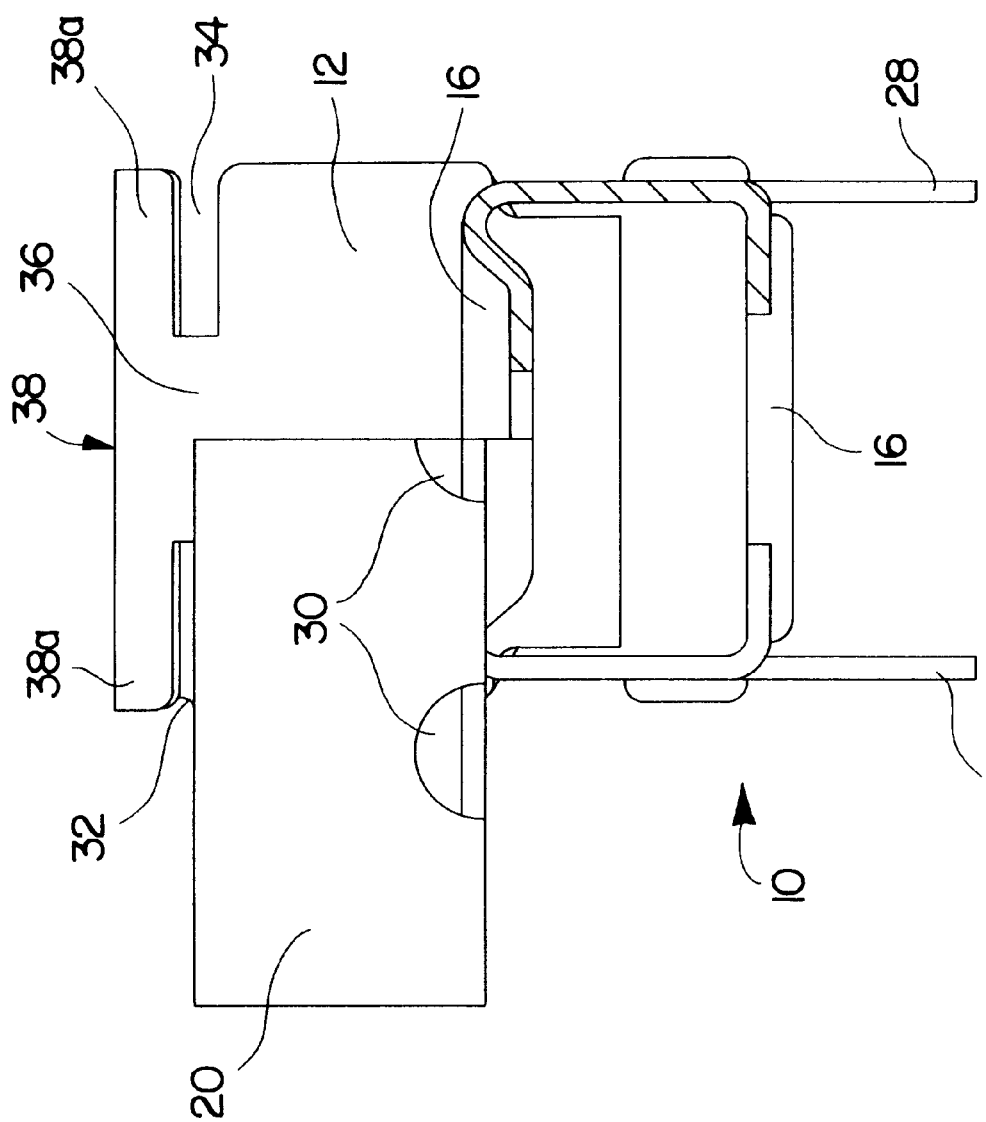
FIG. 3 shows the joist element illustrated in FIG. 1, in a longitudinal section along Line III—III.

FIG. 3 shows a partial cross section of the joist element 10 along line III—III in FIG. 1. The left half of the figure shows the realization of the receptacle 20 and the right half of the figure shows the realization of the lug 12. On the underside of the joist element 10, there are projections 26, 28 that project beyond the ridge-side end and which form part of the projection 24. In the vicinity of the lower edge of the receptacle 20, there are penetrations 30 that make possible the discharge of fluid.

On the bracket-shaped lug 12, at a short distance from the upper edge, there are slots 32, 34 that begin on both sides of the edges. The upper terminal segment of the lug 12 can thereby be realized in a simple manner in the form of a toggle-like extension 38 having two side wings 38a connected to the main part of the lug by the narrow neck 36 and the wall in the vicinity of the upper edge of the toggle. A neighboring joist element to be supported that is identical to the joist element 10 can have lower side portions inserted into the slots 32, 34, so that the neck 36 rests in a form-fitting and slidable manner in the slot 16, and the toggle-like extension 38 rests inside the neighboring joist element.

Figure 4:
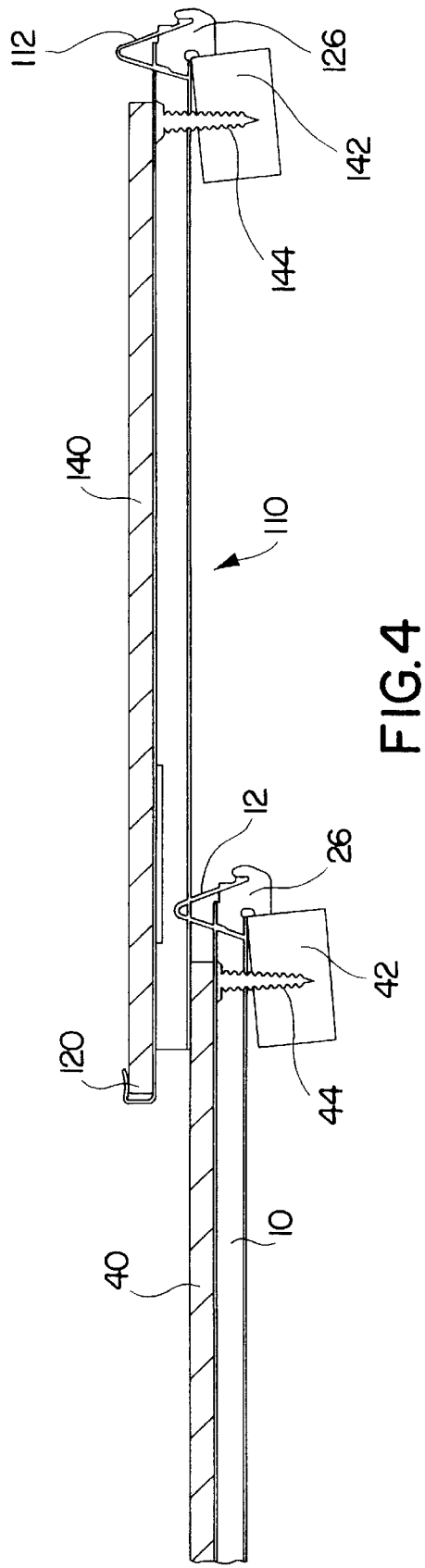
FIG. 4 shows two installed joist elements, in a side view.

FIG. 4 shows two overlapping flat plate-shaped structural elements 40, 140 on joist elements 10 and 110 respectively in longitudinal section, whereby the joist element 110 nearer the ridge is supported on the neighboring joist element 10 toward the eaves. The reference numbers indicate the same parts as in FIGS. 1 to 3, although the joist element 110 is assigned reference numbers that are higher by 100. The U-shaped receptacle 120 that grips the eaves-side end of the overlying structural element 140 in the manner of a claw is formed on the eaves-side end, as shown here on the joist element 110. Each of the joist elements 10,110 lies with its ridge-side end in contact with a roof batten 42 and 142 respectively, and is fastened to the roof batten by means of a fastener 44, 144 realized in the form of a screw. On the joist element 110, by way of example, the figure shows the support of the eaves-side end, which is theoretically the same for all the joist elements. The eaves-side end can be moved longitudinally and is supported by means of a lug 12 on the ridge-side end of the underlying joist element 10.

The support of the joist element 110 nearer the ridge is provided at a height that is at least equal to the thickness of the plate-shaped structural element 40 i.e. a height of at least 1 cm. In this manner, the joist element 110 nearer the ridge can, during installation, be shifted in the eaves direction with respect to the lower joist element 10 and the overlying structural element 40, until its ridge-side projection 126 comes into contact with the side of the roof batten facing the ridge, and its eaves-side terminal segment overlaps the lower structural element 40. The upper structural element 140 lying on the joist element 10 nearer the ridge is at some distance from the lower structural element 40 as a result of the eaves-side terminal segment of the joist element 110 nearer the ridge, whereby it overlaps a ridge-side edge segment of the lower structural element 40.

One feature of the invention resides broadly in the joist element 10 for fastening a flat plate-shaped structural element 40, in particular a photovoltaic element, to a pitched roof, whereby the joist element 10 is laid in the ridge-eaves direction and can be fastened to the roof substructure, characterized by the fact that on the joist element 10 there is a lug 12 that supports a neighboring joist element 110 located in the same slope line in the ridge direction at a height above the surface of the plate-shaped structural element lying on the joist element 10, so that it can be displaced longitudinally.

Another feature of the invention resides broadly in the joist element characterized by the fact that the lug 12 is located on the upper side of the joist element 10 in the vicinity of its ridge-side terminal segment.

Yet another feature of the invention resides broadly in the joist element characterized by the fact that the lug 12 is realized in the form of a separate component, formed of a separate piece of sheet metal.

Still another feature of the invention resides broadly in the joist element characterized by the fact that the lug 12 can be fastened to the joist element 110 by means of locking connection elements.

A further feature of the invention resides broadly in the joist element characterized by the fact that the joist element 10, at least in the vicinity of its eaves-side terminal segment, has a slot 16 and the lug 12 has a toggle-like extension 38.

Another feature of the invention resides broadly in the joist element characterized by the fact that the joist element 10 is realized in the form of a thin-walled profile.

Yet another feature of the invention resides broadly in the joist element characterized by the fact that in relation to the plane of the sub-roofing construction, the height of the upper side of a joist element 10 is at least equal to the height of the water channel of a roofing plate.

Still another feature of the invention resides broadly in the joist element characterized by the fact that on the eaves-side end, there is a hook-like receptacle 20 that grips the plate-shaped structural element.

A further feature of the invention resides broadly in the joist element characterized by the fact that the distance between the base of the receptacle 20 on the eaves-side end and the lug 12 on the ridge-side end is greater than the length of the plate-shaped structural element 40 by at least the length of the hook of the receptacle 20.

Another feature of the invention resides broadly in the joist element characterized by the fact that on the ridge-side end of the joist element 10, there is a bearing 14 for a fastening element 44 for fastening to the roof substructure 42.

Yet another feature of the invention resides broadly in the joist element characterized by the fact that on the ridge-side end of a joist element 10, on the underside, there is a projection 26, 28 which makes it possible to hang the joist element 10 on the roof substructure 42.

Details of additional inventions which may prove helpful in understanding the instant invention, and which inventions may be used in or in conjunction with the present invention, follows.

This invention relates to a photovoltaic system for a pitched roof covered with roofing plates, with joist elements that can be laid in the ridge-eaves direction, which joist elements can be laid overlapping one another in the ridge-eaves direction, whereby plate-shaped photovoltaic modules having photovoltaic cells are located on the joist elements butted up against one another or adjacent to neighboring roof covering plates, the length of which modules can be greater than the greatest coverage length of a roofing plate, and the width of which can be greater than the system coverage width of the roofing plate.

A photovoltaic system for a pitched roof covered with roofing plates is described in EP-A-0 549 560. The photovoltaic system has frame-like joist elements that can be laid overlapping in the ridge-eaves direction. A plate-shaped photovoltaic module having photovoltaic cells can be inserted into each joist element, whereby the length of the photovoltaic module is greater than the greatest coverage length of a roofing plate, and the width of which is greater than the system coverage width of a roofing plate.

The lateral longitudinal edges of a joist element are realized in the conventional manner for a roofing plate in the form of water channels or bottom baffles and cover channels or top baffles. In this manner, joist elements and roofing plates can be laid in a row parallel to the eaves so that a joist element, with its lateral longitudinal edge which is realized in the form of a cover channel, always covers the lateral longitudinal edge of the neighboring joist element or of the neighboring roofing plate which is realized in the form of a water channel. On the photovoltaic system of the known art, it is not possible to install the photovoltaic modules with butt joints.

FR-A-2 354 430 describes a photovoltaic module that has an eaves-side segment with solar cells and a ridge-side segment that does not have any solar cells. The photovoltaic modules can be laid so that they overlap one another in the ridge-eaves direction, whereby a photovoltaic module is in contact with its ridge-side segment directly on a roof batten that runs in the direction parallel to the ridge, and is covered by the ridge-side segment with the solar cells of the higher photovoltaic module in the ridge-eaves direction. With the ridge-side segment, each photovoltaic module is supported on the segment that does not have the solar cells on the lower photovoltaic module in the ridge-eaves direction. The photovoltaic modules are not fixed to the roof batten on the ridge side, so that on each roof batten there is a hook that is engaged around the ridge-side edge of a roof batten and the ridge-side edge of an overlapped photovoltaic module. The hook is inserted between the overlapping photovoltaic modules and is engaged around the eaves-side edge of the overlapping photovoltaic module. In this manner, the hook prevents the displacement of the overlapping photovoltaic module toward the eaves.

The object of the invention is to create a photovoltaic system of the type described above that can be integrated in the form of a modular system into a roof covering consisting of small-format roofing plates, and one that can also be installed into an already-covered roof essentially without requiring any adaptation work, and also makes it possible to replace photovoltaic modules without the need to perform any installation work on the fastening system.

The invention teaches that this object can be accomplished by providing a joist element as described, so that the width of a photovoltaic module supported by the joist can be equal to a whole-number, or integral, multiple of the system coverage width of the roofing plate, so that in the ridge-eaves direction, the length of the area inside a photovoltaic module having the photovoltaic cells is preferably shorter than the shortest coverage length of a neighboring roofing plate, so that a photovoltaic module has, at the ridge side, a peripheral segment free of photovoltaic cells, and that a sub-roofing element can be laid on a joist element and below the photovoltaic module, which sub-roofing element preferably has a water drain channel that can be positioned underneath the longitudinal edge of a photovoltaic module.

The photovoltaic modules laid on the joist elements in a row parallel to the eaves can be butted up against one another or against neighboring roofing plates. In that case, there is a gap at each joint that must be sealed to prevent the penetration of rainwater. On the photovoltaic system as claimed by the invention, therefore sub-roofing elements can be laid on a joist element and underneath the photovoltaic module, the water channels in which can be positioned underneath the longitudinal edge of a photovoltaic module. These sub-roofing elements can be made of thin plastic material, for example, and in the simplest case can be realized in the form of a drain channel that has an approximately U-shaped cross section.

The photovoltaic modules of this photovoltaic system, as a result of their dimensions, can be installed in place of a number of commercially available roofing plates. The length of the photovoltaic modules is advantageously the same as the length of a roofing plate. Because the coverage width of concrete roofing tiles is generally 30 cm and the coverage width of clay roofing tiles is 20 cm, the width of a photovoltaic module can be selected, for example, so that it equals the coverage width of four concrete roofing tiles or six clay roofing tiles, for example, so that the outside dimensions of the photovoltaic module are approximately 38 cm×120 cm. Of that area, an area of 25 cm×114 cm can be occupied by photovoltaic elements, whereby on each longitudinal side there can be a free edge of 3 cm, an edge of 2 cm toward the eaves and 11 cm toward the ridge. Such a photovoltaic module can currently use silicon cells to generate an electric power of approximately 35 Watts. One generator unit should have at least 20 modules.

In an offset arrangement of the roofing plates, these plates are offset in a row by one-half the coverage width with respect to the edge-side or eaves-side neighboring row. If a plurality of modules are laid partly overlapping one another in the ridge-eaves direction, preferably these modules are likewise offset in each row by one-half the coverage width of a roofing plate when laid adjacent to an offset roof covering, or roofing plate, i.e. By approximately 10 to 15 cm. Because the joist elements can be arranged as required in the transverse direction, it is nevertheless possible to lay them in a line, without requiring any compensation on the edges involving the use of half-width roofing plates.

The distance between the roof battens can be varied from roof to roof as a function of the overlap of the roofing plates. The greatest overlap and thus the smallest coverage length is on a roof that has a flat pitch angle. To be able to integrate the photovoltaic system into any desired roof, it is thereby advantageous if the area within a photovoltaic module that contains the photovoltaic cells is not longer than the shortest coverage length. In this manner, the photovoltaic cells will not be in shadows, which can occur in marginal cases if a module designed for a greater coverage length is inadvertently laid on a roof that has a shorter coverage length. The system is thereby extremely easy to use, and can even be installed by do-it-yourselfers.

The support can be located on the ridge-side end on the upper side of a joist element.

The modules can be installed and replaced essentially without requiring the use of tools, if a joist element, on its eaves-side end, has a locator or receptacle that grips the edge of a module, and if the free width between the edge of the locator and the support is equal to at least the length of a module. In this manner, during installation, a module can be pushed up to the supports of the joist element, then laid on the joist elements, and then inserted into the locator in the eaves-direction. The module can be removed by following the reverse sequence of operations. It goes without saying that a locator that grips the eaves-side end of the joist element can also be provided on the module. The electrical connections can be advantageously realized in the form of plug-in connectors.

There is no need for special measures to secure the installation of the photovoltaic system, if the support of a joist support element is realized in the form of a toggle-like coupling element that is engaged in a slot on the underside of the overlying joist element, to prevent any lifting-off of the overlying joist element.

The photovoltaic modules of the photovoltaic system are particularly flat if they are realized without a frame.

To create a tight seal, in particular for a photovoltaic module, in particular one that has a smooth underside, it is advantageous if the sub-roofing element extends over at least the entire width of a photovoltaic module and has an eaves-side edge that is realized so that it provides protection against penetration by snow and rain, which edge can be located in the overlapping area of two photovoltaic modules. Because there can be a gap of approximately 1.2 cm in the overlapping area of two modules approximately 1 cm thick on a roofing plate 2.2 cm thick, the sub-roofing element can be used to seal this gap.

This sealing is only effective against the penetration of water if the sub-roofing element has ventilation openings on its eaves-side edge. A labyrinth can be connected to these openings that also provides protection against blowing snow. Ventilation must be used, however, to conduct a cooling air flow along the underside of a photovoltaic module. Such an air flow prevents excessive heating and the related reduction in the output of a photovoltaic module. The heated air discharged on the ridge-side edge is advantageously guided along the underside of the following sub-roofing element, so that heated air does not come into contact with any other photovoltaic modules until it reaches the ridge.

The accompanying drawing illustrates at least one preferred exemplary embodiment of the invention, which is explained in greater detail below with reference to the figures.

Figure 5:
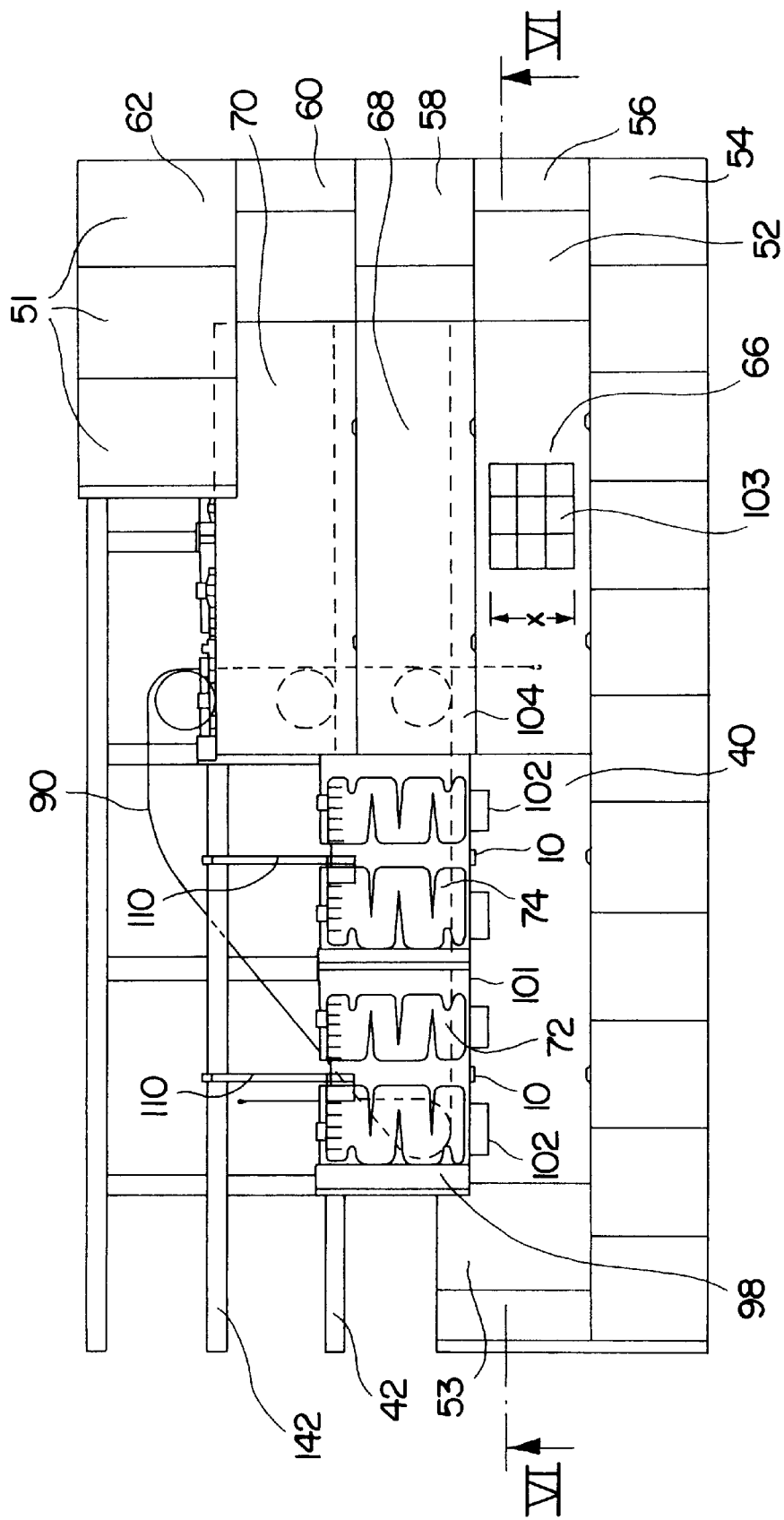
FIG. 5 shows a photovoltaic system in an overhead view.

FIG. 5 shows a pitched roof partly covered with flat roofing plates 51, 52, 53 made of concrete and laid in offset rows 54, 56, 58, 60, 62, in a schematic overhead view. Photovoltaic modules 40, 66, 68 and 70 are shown in Rows 56, 58, and 60. In row 58, in an area not covered by photovoltaic modules, sub-roofing elements are shown, and in row 60 the figure shows the joist elements 110 in a first stage of construction as they are fastened on their ridge-side ends to a roof batten 142. On their eaves-side ends, the joist elements 110 are supported on joist elements 10 that are located adjacent on the eaves-side in the same slope line and that in turn are fastened on the ridge side to the roof batten 42 located underneath them. The sub-roofing elements 72, 74 are approximately half as wide as a photovoltaic modules 40, 66, 68, 70 and each of them, on its edge as illustrated in FIG. 5, like the sub-roofing element 72, has a trough-shaped water channel 88. The photovoltaic modules 40 and 66 laid next to one another in the first row 56 are butted up against one another. On its other end, the photovoltaic module 66 is in contact with the water channel of the neighboring roofing plate 52, while the photovoltaic module 40 with its other end abuts the cover channel of the neighboring roofing plate 53. Underneath the butt joints, there are water channels of sub-roofing elements not visible in the figure underneath the photovoltaic modules 40 and 66, which are identical to the sub-roofing elements 72, 74 in Row 58. For the electrical connection of the individual photovoltaic modules 40, 66, 68, 70 with one another and with other modules not shown here, there are cables 90, which are connected to the modules by means of plug-in connections.

Figure 6:
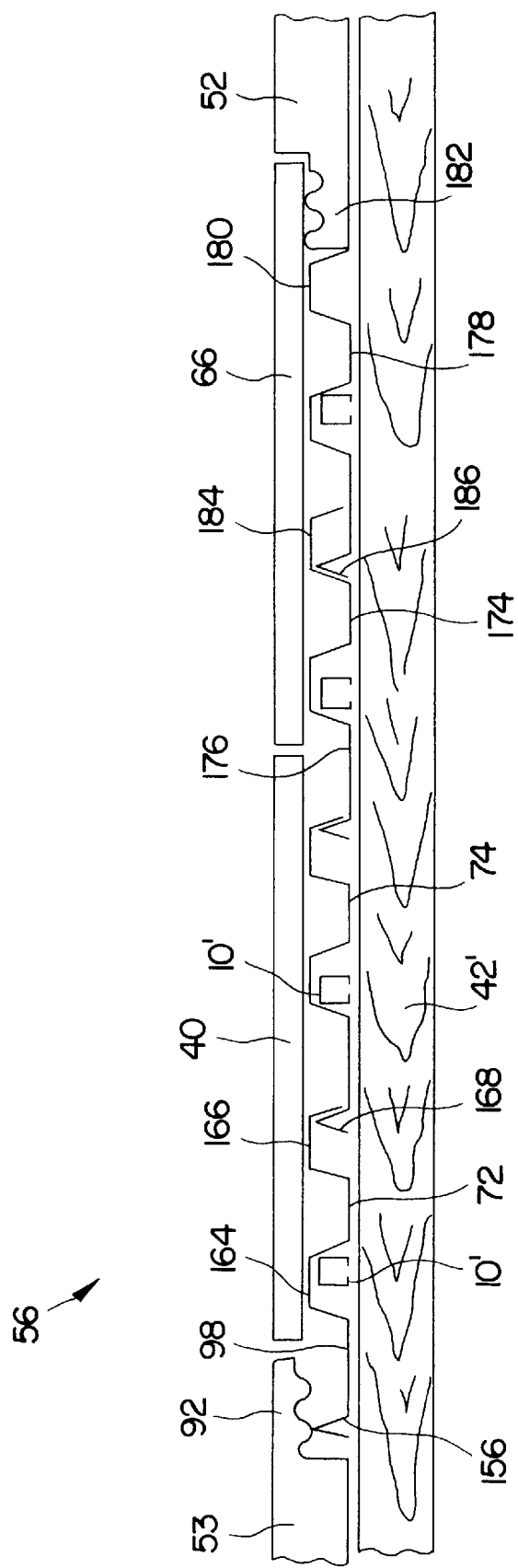
FIG. 6 shows the photovoltaic system illustrated in FIG. 5 in a cross section along Line VI—VI.

FIG. 6 shows row 56 of the roof illustrated in FIG. 5 in a cross section along Line VI—VI parallel to the eaves. In this case, the first roofing plate 53 is on the left, which has a raised cover channel 92 on the right side. Following the first roofing plate 53 is a first sub-roofing element 72 which is in contact with a narrow raised bead 156 running along its left longitudinal edge against the underside of the cover channel 92 of the first roofing plate 53, while the free longitudinal edge of the cover channel 92 is located above a water channel 98 of the first sub-roofing element 72. The first sub-roofing element 72 is penetrated in its transverse direction, approximately in the center, by a first joist element 10' fastened to a roof batten 42', which joist element is located so that it can be displaced in the transverse direction in a raised bead 164 located approximately in the center of the first sub-roofing element 73. By means of a wide raised bead 166 running on the right longitudinal edge, the first sub-roofing element 72 overlaps the narrow raised bead 168 running on the left longitudinal edge of a second sub-roofing element 74, which is fastened in the same manner to a second joist element 10'.

To explain, in at least one embodiment of the present invention, the first sub-roofing element 72 can have a portion of a first longitudinal joist element 10' passing longitudinally through its raised bead 164. This wide raised bead 164 can be of sufficient dimension to allow the joist element 10' to have room to move in the transverse direction within this bead. In at least one embodiment this movement could possibly allow the joist to be positioned into a desirable position within the bead during installation of the joist 10'.

So that two neighboring sub-roofing elements 72, 74 retain their maximum extension in their longitudinal direction, the second sub-roofing element 74 is pulled to the right in the direction parallel to the eaves, so that its narrow raised bead 168 held by the wide raised bead 166 of the first sub-roofing element 72 is in direct contact with the right lateral surface of the wide raised bead 166 of the first sub-roofing element 72. Located on the two joist elements 10' there is a first photovoltaic module 40, which on the left abuts the cover channel 92 of the first roofing plate 53 and on the right abuts the neighboring second photovoltaic module 66. To the right of the second sub-roofing element 74, a third sub-roofing element 174 is laid in the manner described above. The butt joint between the photovoltaic modules 40, 66 is in this case located above the water channel 176 of the third sub-roofing element 174.

To the right of the third sub-roofing element 174, in a manner similar to that described above, there is a fourth sub-roofing element 178, which by means of a wide raised bead 180 running along the right longitudinal edge abuts the recessed water channel 182 on the left edge of the second roofing plate 52. The third and the fourth sub-roofing elements 174, 178 are overlapped by the second photovoltaic module 66.

Because the first three sub-roofing elements 72, 74, 174 have each been laid with the maximum extension, and the fourth sub-roofing element 178 is butted up against the second roofing plate 52, the necessary coverage width of the fourth sub-roofing element 178 is less than the maximum extension by the width of the water channel 182 of the second roofing plate 52. When the roofing plates are laid, the fourth sub-roofing element 178 has therefore been displaced to the left by the width of the water channel 182 in the direction parallel to the eaves, so that its narrow raised bead 186 held by the wide raised bead 184 of the third sub-roofing element 174 is in direct contact with the left lateral surface of the wide raised bead 184 of the third sub-roofing element 174. The coverage width of the sub-roofing elements 154, 170, 174, 178 can therefore be adapted without any major problems to the construction requirements of the specific situation.

FIG. 5 shows schematically additional possible features of at least one embodiment of the present invention, wherein the sub-roofing elements 72, 74 extend over the entire width of a photovoltaic module and can have an eaves-side edge realized so that it provides a seal 101 against rain and snow, which edge can be located in the overlapping area between two photovoltaic modules 68, 66 or 70, 68. Further, in at least one embodiment the sub-roofing element 72, 74 can have ventilation openings 102 on its eaves-side edge. Further, FIG. 5 shows schematically that in one possible embodiment, the length X of the area inside a photovoltaic module 40, 66, 68, 70 having the photovoltaic cells 103 can be shorter than the shortest coverage length of a neighboring roofing plate 51, 53, so that, on the side nearer the ridge, a photovoltaic module 40, 66, 68, 70 has an edge segment 104 that is free of photovoltaic cells.

One feature of the invention resides broadly in the photovoltaic system for a pitched roof covered with roofing plates 51, 52, 53 with joist elements 10, 110 that can be laid in the ridge-eaves direction and can be laid so that they overlap in the ridge-eaves direction, whereby plate-shaped photovoltaic modules 40, 66, 68, 70 that have photovoltaic cells are butted up against one another or are adjacent to neighboring roofing plates, the length of which modules is greater than the greatest coverage length of a roofing plate 51, 53, and the width of which is greater than the system coverage width of the roofing plate 51, 52, 53, characterized by the fact that on the joist element 10, 110 there is a support 12, 112 which, when two joist elements 10, 110 are located in the same slope line, supports the ridge-side joist element 110 on the neighboring joist element 10 adjacent in the eaves direction at a height above the surface of the photovoltaic module 40 lying on top of it, so that the joist element 110 can be moved longitudinally, that the width of a photovoltaic module 40, 66, 68, 70 is equal to a whole-number multiple of the system coverage width of the roofing plate 51, 52, 53, that in the ridge-eaves direction, the length of the area inside a photovoltaic module 40, 66, 68, 70 having the photovoltaic cells is shorter than the shortest coverage length of a neighboring roofing plate 51, 53, so that, on the side nearer the ridge, a photovoltaic module 40, 66, 68, 70 has an edge segment that is free of photovoltaic cells, and that a sub-roofing element 72 can be laid on a joist element 10 and underneath the photovoltaic module 40, which has a water channel 98 that can be positioned underneath the longitudinal edge of a photovoltaic module 44.

Another feature of the invention resides broadly in the photovoltaic system characterized by the fact that with respect to the plane of the substructure of the roof, the height of the upper side of a joist element 10' is at least equal to the height of the water channel 182 of a laterally adjacent roofing plate 52, so that a photovoltaic module 66 to be laid on the water channel side of an adjacent roofing plate overlaps the water channel 182 and a photovoltaic module 40 to be laid on the cover channel side of an adjacent roofing plate 53 is butted up against the cover channel 92.

Another feature of the invention resides broadly in the photovoltaic system characterized by the fact that the photovoltaic modules 40, 66, 68, 70 are realized without frames.

Yet another feature of the invention resides broadly in the photovoltaic system characterized by the fact that sub-roofing elements 72, 74 extend over the entire width of a photovoltaic module and have an eaves-side edge realized so that it provides a seal against rain and snow, which edge is located in the overlapping area between two photovoltaic modules 68, 66 or 70, 68.

Still another feature of the invention resides broadly in the photovoltaic system characterized by the fact that the sub-roofing element 72, 74 has ventilation openings on its eaves-side edge.

To aid in the understanding of the present invention the following text and figures has also been added, which better explain some of the possible structures which may be found in and/or used in conjunction with at least one embodiment of the present invention.

This invention may make use of a sub-roofing element for a flat, plate-shaped structural element, in particular for a photovoltaic module that can be fastened to joist elements that can be laid on a pitched roof in the ridge-eaves direction, whereby the sub-roofing element is made of watertight material and has at least one water channel.

European Patent No. 0 547 285 and German Patent No. 33 14 637 disclose a roofing plate that can be provided on its upper side with a small-format photovoltaic module. The roofing plate is provided on one longitudinal edge with a water channel or drip edge, and on the other longitudinal edge with a cover channel or water stop. The photovoltaic module is always supported on the roofing plate close to the water channel and the cover channel. When the roof is being laid, the roofing plates are laid in a course parallel to the eaves, whereby one roofing plate, with its cover channel, always overlaps the water channel of a neighboring roofing plate in the same course, so that no rain water can penetrate between the roofing plates.

The invention provides a seal for a system of structural elements, in particular a photovoltaic system, in which the structural elements are butted up against one another in the transverse direction and against neighboring roofing tiles, partly overlap one another in the longitudinal direction, and are laid on joist elements that are located at a distance from a butt joint.

The invention teaches that this object can be accomplished if the sub-roofing element on the joist elements and underneath a plate-shaped structural element can be laid and is shaped so that there is at least one raised bead that runs in the ridge-eaves direction, can receive a joist element and the bead is wider than the joist element, so that the sub-roofing element can be displaced parallel to the eaves, and so that the water channel can be located underneath the longitudinal edges of two plate-shaped elements butted up against one another. Preferably, the joist elements are laid in lines tangent to approximately the quarter points, or quarter-chord points, of the structural elements, so that the transverse distance between two joist elements equals one-half the width of a structural element. It is therefore advantageous to provide sub-roofing elements at approximately one-half the width of the structural elements. For example, sub-roofing elements that have outside dimensions of 42.1 cm×64.4 cm for use with photovoltaic modules that have outside dimensions of approximately 38 cm×120 cm. the width dimension which is greater than one-half the width results from the fact that two neighboring sub-roofing elements are laid so that their edges overlap. An overhang in the longitudinal direction makes possible good ventilation on the underside of the photovoltaic modules.

A sub-roofing element essentially does not need to absorb any bearing forces, so that it can be made of a plastic film, i.e. one that can be manufactured using a deep drawing, or swedging, or extrusion process. When very thin material is used, the use of a reinforcement is recommended in the vicinity of the water channel, which can be realized in the form of a groove or trough, for example, as a separate component.

The sub-roofing element can lie on the upper side of the joist element and protect the underside of the structural element, if the sub-roofing element has a penetration at least in the vicinity of the eaves-side terminal segment of the raised bead that contains the joist element, through which penetration a locator of the joist element for the plate-shaped structural element can be inserted.

A tight laterally overlapping laying of the sub-roofing elements is possible if, in the vicinity of both longitudinal edges, at least one raised bead is provided, whereby the raised bead on one end can act as a receptacle for the raised bead on the other edge of a neighboring, identical sub-roofing element. Preferably, the raised bead is narrow on one edge and sufficiently wide on the other edge so that the narrow raised bead covered by the wide raised bead can be pushed sideways. Dimensional tolerances can thus be easily compensated during laying. In particular when installing structural elements that are laid on one side on the water channel of an adjacent roofing plate, but have a butt joint on the other side, there coverage width in the transverse direction for the structural element on top of the water channel is less than for another element. Therefore it is advantageous if the sub-roofing element laid adjacent to the water channel of the roofing plate can be displaced by the width of the water channel in the transverse direction toward the neighboring sub-roofing element.

To explain, in at least one embodiment of the present invention when a structural element is installed such that a longitudinal edge overlaps the water channel of an adjacent roofing plate, the amount of this overlap can reduce the transverse coverage width which the sub-roofing elements preferably cover, as compared to another possible structural element. Therefore, it is advantageous if the sub-roofing element laid adjacent to the water channel of the roofing plate can be displaced, or shifted, by the width of the water channel in the transverse direction toward the neighboring sub-roofing element.

This capability can be achieved if the receiving raised beads are wider than the raised beads or the joist to be received.

The sub-roofing element can create a particularly good seal for the peripheral area of a structural element lying on the water channel of a neighboring roofing plate if the peripheral segment of the longitudinal edge adjacent to the receiving raised bead is as wide as the raised bead it is designed to receive. The peripheral segment of the sub-roofing element can thereby be positioned underneath the water channel.

The receiving raised bead on one longitudinal edge and the water channel on the opposite longitudinal edge can be realized so that they are approximately complementary to one another, if the water channel is realized so that it is adjacent to the receiving raised bead.

Not only can the sub-roofing element drain off any water that has penetrated, but it can also influence the ventilation underneath the structural elements, if the longitudinal edges and the eaves-side edge of the sub-roofing element run at the height of the low areas, or recessed areas, and the ridge-side edge runs at the height of the equally-high raised beads, whereby all the raised beads have the same height.

The objective is to have a controlled ventilation, to conduct a cooling air current along the underside of a photovoltaic module. In midsummer in particular, it thereby becomes possible to prevent excessive heating and the related decrease in the efficiency of a photovoltaic module. Advantageously, the heated air being discharged at the ridge-side edge is guided along the underside of the following sub-roofing element, so that the heated air does not come into contact with other photovoltaic modules before it is exhausted at the ridge. To achieve this ventilation, a sub-roofing element is preferably longer than a photovoltaic module. The sub-roofing element projects beyond the ridge-side edge of the photovoltaic module, so that the air that enters at the eaves-side edge can be discharged toward the ridge.

The penetration of snow and small animals in the gap between the overlapping structural elements can be prevented if there are baffles that form labyrinths on the eaves-side edge of the sub-roofing element. These chambers form a labyrinth, through which nothing can pass directly.

The installation of the sub-roofing elements and of the joist elements is simplified if, on the ridge-side edge, there is at least one suspension lug for the suspension of the sub-roofing element on a roof batten or a similar structure. The sub-roofing element is thereby adjusted in the longitudinal direction with respect to the ridge-side upper edge of the roof batten. If the distance between the suspension lugs and the eaves-side edge is essentially equal to the distance between the suspension lugs and the eaves-side edge of a neighboring roofing plate, the result for the sub-roofing elements claimed by the invention is the same geometric position as for the neighboring roofing plates, regardless of the actual distance between the roof battens. This distance can vary from roof to roof on account of the overlap of the roofing plates, which is a function of the pitch of the roof.

Figure 7:
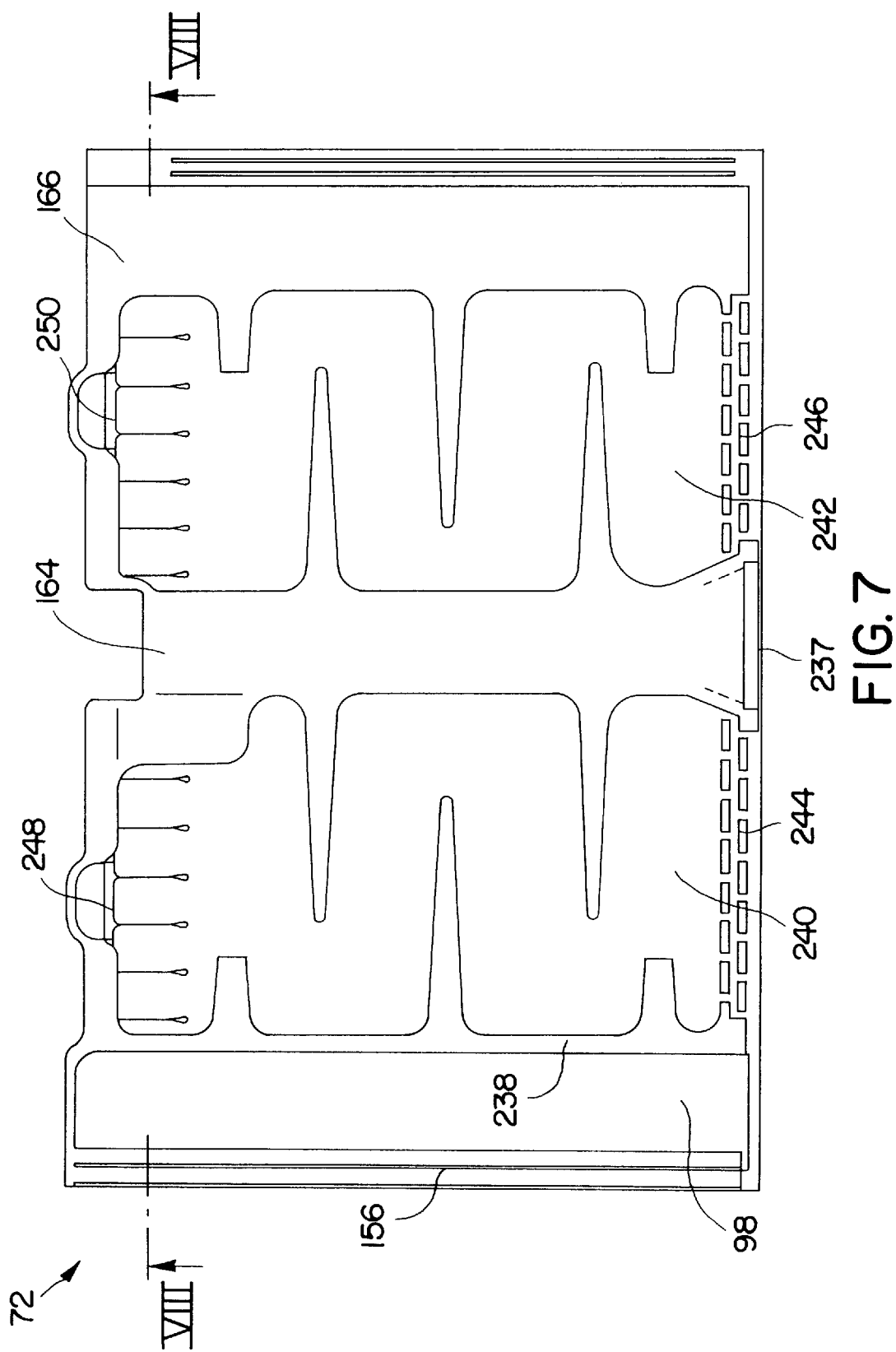
FIG. 7 shows a sub-roofing element in an overhead view.

FIG. 7 illustrates a sub-roofing element 72 in an overhead view. This element can consist of deep-drawn plastic film. With outside dimensions of 42.1 cm×64.4 cm×1.3 cm, the sub-roofing element 72 is suitable for a photovoltaic module having the dimensions 38 cm×120 cm, whereby two sub-roofing elements 72 are designed to be laid next to one another underneath a photovoltaic module. On the left side as illustrated in FIG. 2, there is a water channel 98 that is realized in the form of a wide recessed bead, while on the right-hand side there is a wide raised bead 166. On the outer longitudinal edge of the water channel 98 there is a narrow, double raised bead 156, which can be adapted to the bottom contour of the cover channel of a roofing plate 53, and can be received by the wide raised bead 166 of a neighboring sub-roofing element. A wide central raised bead 164 is provided as a receptacle for the joist element 10, which supports the structural element or the photovoltaic module. In the vicinity of its eaves-side terminal segment, the raised bead 164 that acts as a receptacle for the joist element has a penetration 237, through which a receptacle 20 of the joist element can be inserted. The inner edge of the water channel forms a narrow raised bead 238. All the raised beads 166, 156, 164 and 238 run in the longitudinal direction, i.e. on the roof from the ridge to the eaves.

Between the raised beads 238 and 164 as well as 164 and 166 there are recessed areas 240 and 242 respectively, which can be provided with toothed reinforcement ribs that run in the transverse direction but not over the entire width of a recessed area 240, 242. On the eaves-side edge of each of the recessed areas 240, 242, there are two rows of baffles 244 and 246 respectively that form labyrinths. On the ridge-side edge of each recessed area 240, 242, there is a suspension lug 248, 250.

Figure 8:
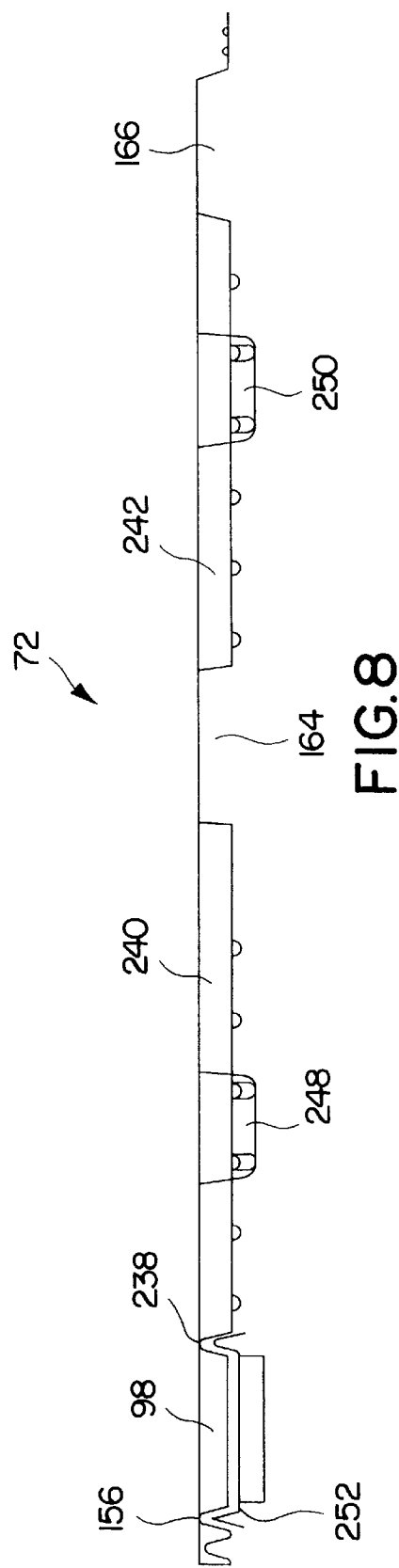
FIG. 8 shows the sub-roofing element illustrated in FIG. 7 in a cross section along line VIII—VIII.
Figure 9:
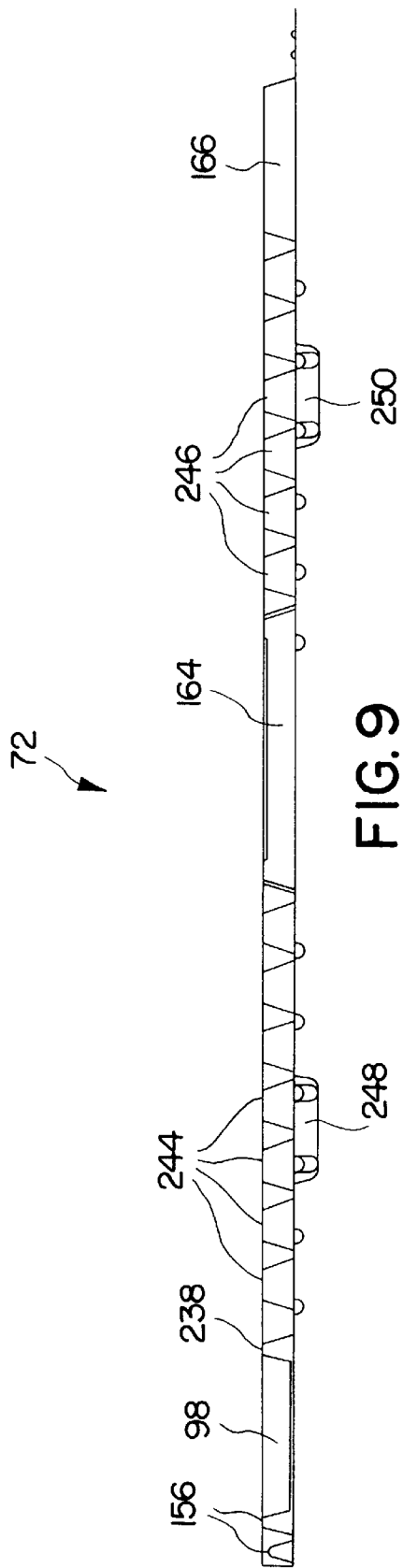
FIG. 9 shows the sub-roofing element illustrated in FIG. 7 in an end view, from the eaves side.
Figure 10:
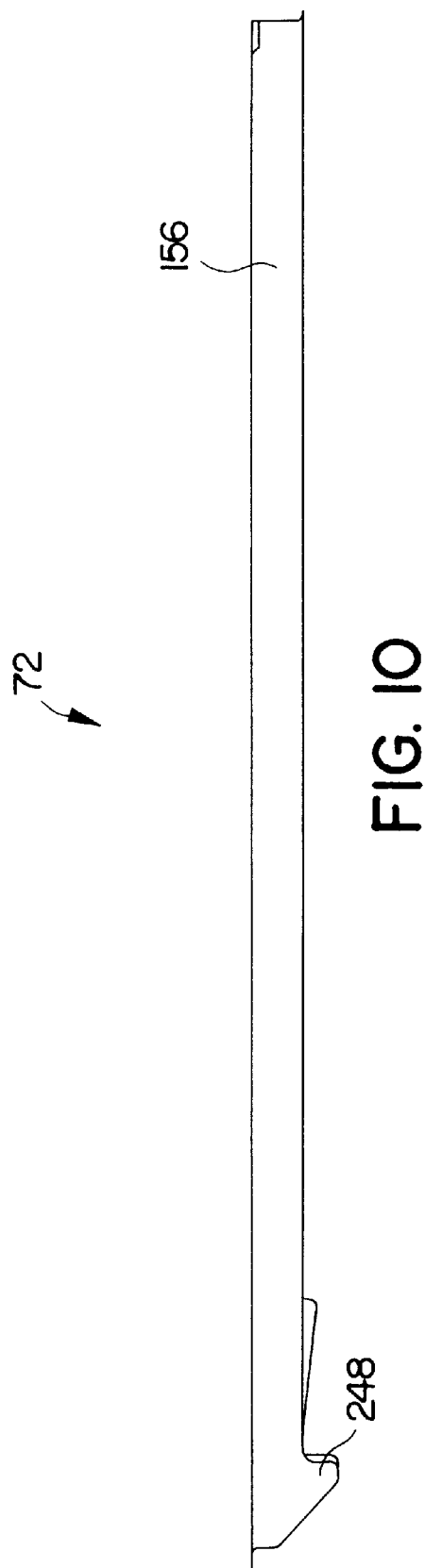
FIG. 10 shows the sub-roofing element illustrated in FIG. 7 in a side view.

FIGS. 8 to 10 illustrate the position and orientation of the raised beads 166, 156, 164 and 238 described above, of the water channel 98, of the recessed areas 240, 242, of the baffles 244 and 246 and of the suspension lugs 248 and 250.

In FIG. 8, below the water channel 98, there is a reinforcing component 252, in this case a channel preferably made of sheet metal. The side walls of this channel project into the raised beads 156 and 238. On the ridge-side edge, one tab is bent downward, so that the reinforcing component 252 can also be suspended on a roof batten.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The published PCT application to which the present U.S. application corresponds, namely PCT/DE97/00646, the published Fed. Rep. of Germany application from which it claims priority 196 12 488.3, as well as all documents cited in the International Search Report issued thereon, including Federal Republic of Germany Patent No. DE 151 738 C issued to Internat. Maatschappij TOT Exploitatie van Gebreveteerde on May 31, 1994, Fed. Rep. of Germany Patent No. DE 221 279 C issued to Damm on Apr. 23, 1910, International Application No. WO 94 24384 A issued to Wadding-ton on Oct. 27, 1994 (and its U.S. counterpart, U.S. Pat. No. 5642596 A, issued on Jan. 7, 1997), and French Patent No. FR 2 491 112 A issued to Gross on Apr. 2, 1982, are hereby expressly incorporated by reference as if set forth in their entirety herein.

The published PCT application to which the present U.S. application corresponds, namely PCT/DE97/00648, the published Fed. Rep. of Germany application from which it claims priority 196 12 489.1, as well as all documents cited in the International Search Report issued thereon, including European Patent No. EP 0549 560 A issued to Sedelmayer on Jun. 30, 1993, French Patent No. 2 354 430 A issued to Radiotechnique Compelec on Jan. 6, 1978, Fed. Rep. of Germany Patent No. DE 44 08 508 A issued to Sesol Ges Fuer Solare Systeme on Sep. 21, 1995, Fed. Rep. of Germany Patent No. DE 92 09 228 U issued on Nov. 5, 1992, U.S. Pat. No. 4 040 867 issued to Forestieri et al. on Aug. 9, 1977, Fed. Rep. of Germany Patent No. DE 33 14 637 A issued to BM Chemie Kunststoff on Nov. 17, 1983, and Fed. Rep. of Germany Patent No. DE 43 32 873 A issued to Rieter Werke Haendle on Mar. 30, 1995, are hereby expressly incorporated by reference as if set forth in their entirety herein.

The published PCT application to which the present U.S. application corresponds, namely PCT/DE97/00647, the published Fed. Rep. of Germany application from which it claims priority 196 12 490.5, as well as all documents cited in the International Search Report issued thereon, including European Patent No. EP 0547 285 A issued to Rieter Werkle Haendle on Jun. 23, 1993, Fed. Rep. of Germany Patent No. DE 33 14 637 A issued to BM Chemie Kunststoff on Nov. 17, 1983, Swiss Patent No. CH 682 831 A issued to Rolf on Nov. 30, 1993, and Great Britain Patent No. GB 2 266 903 A issued to Redland Eng. LTD on Nov. 17, 1993, are hereby expressly incorporated by reference as if set forth in their entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Some examples of U.S. Patents which could possibly be used in conjunction with the present invention are as follows:

Some examples of photo voltaic systems are:

| U.S. Pat. No. | Assignee | Inventor(s) | Title |
| --- | --- | --- | --- |
| 5449413 | Optical Coating Lab., Inc. | Beauchamp et al. | UV/IR reflecting solar cell cover |
| 5460659 | Spectrolab, Inc. | Krut | Concentrating photovoltaic module and fabrication method |
| 5385614 | Photon Energy | Albright et al. | Series interconnected photo- |

-continued

| U.S. Pat. No. | Assignee | Inventor(s) | Title |
|---|---|---|---|
| | | | voltaic cells and method for making same |
| 5385615 | United Solar Tech., Inc. | Horne | Solar energy system |
| 5401331 | Midwest Research Institute | Ciszek | Substrate for thin silicon solar cells |
| 5403405 | JX Crystals, Inc. | Fraas et al. | Spectral control for thermophotovoltaic generators |
| 5415700 | State of Oregon | Arthur et al. | Concrete solar cell |
| 5437735 | United Solar Systems Corp. | Younan et al. | Photovoltaic shingle system |
| 5445177 | | Laing & Laing | Platform for the utilization of solar power |
| 5453134 | Semi-conductor Energy Lab. Co., Ltd. | Arai et al. | Solar cell |
| 5468304 | Texas Instr. Inc. | Hammerbacher | Output-increasing, protective cover for a solar cell |
| 5474621 | Energy Conversion Devices, Inc. | Barnard | Current collection system for photovoltaic cells |
| 5409549 | Canon Kabushiki Kaisha | Mori | Solar cell module panel |
| 5408990 | | Edling et al. | Solar energy collection panel assembly |
| 5394075 | Hughes Aircraft Co. | Ahrens et al. | Spacecraft bus regulation using solar panel position |
| 5379753 | | Noennich | Solar panel control apparatus |
| 5379596 | | Grayson | Self-contained hand-held solar chest |
| 5400986 | Martin Marietta Corp. | Amore et al. | Optical solar reflector and mounting method |
| 5439531 | | Finkl | Method and system for maintaining the efficiency of photo-voltaic cells |

Some examples of solar energy collectors are:

| U.S. Pat. No. | Assignee | Inventor(s) | Title |
|---|---|---|---|
| 5411015 | Collins Starnes Assoc. Ltd. | Starnes | Radiation collectors |
| 5431149 | | Fossum & Fossum | Solar energy collector |
| 5452710 | Solar Attic, Inc. | Palmer | Self-sufficient apparatus and method for conveying solar heat energy from an attic |
| 5477848 | | Reed | Solar collector expansion assembly |
| 5388567 | | Hodak | Solar heating panel |

Examples of roofs and/or roofing structures or materials that may possibly to be used in at least one embodiment of the present invention may be found in U.S. Pat. Nos.: 4,929,179 issued on May 29, 1990 to D. Breidenbach, et al.; 5,155,966 issued on Oct. 20, 1992 to D. Breidenbach, et al.; 4,550,791 issued to E. Isakov on Nov. 5, 1985; 5,237,352 issued on Aug. 17, 1993 to C. Grosser et al.; and 5,027,576 issued on Jul. 2, 1991 to L Gustavsson; and U.S. patent application Ser. Nos: 07/530,767 filed on May 25, 1990 having, inventors D. Breidenbach et al.; 08/691,978 filed on Aug. 2, 1996, having inventor E. Isakov; 06/809,073 filed on Dec. 13, 1985, having inventor U. Hintzen; 07/786,040 filed on Oct. 31, 1991, having inventor L. Ballu, et al.; 08/996,827 filed on Dec. 23, 1997, having invento K. Hofmann; 09/002,455 filed on Jan. 2, 1998, having inventor H. Rapp et al.; and 09/036,463 filed on Mar. 6, 1998, having inventors A. Drechsler et al.

All of the patents, patent applications and publications recited herein, and in the Declaration attached hereto, are hereby incorporated by reference as if set forth in their entirety herein.

The corresponding foreign and international patent publication applications, namely, Fed. Rep. of Germany Patent Application No. 196 12 489.1, filed on Mar. 29, 1996, and International Application No. PCT/DE97/00648, filed on Mar. 27, 1997, having inventors Manfred RINKLAKE and Norbert RO__"SLER, and International Publication No. WO 97/37388 published on Oct. 7, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The corresponding foreign and international patent publication applications, namely, Fed. Rep. of Germany Patent Application No. 196 12 490.5, filed on Mar. 29, 1996, and International Application No. PCT/DE97/00647, filed on Mar. 27, 1997, having inventors Manfred RINKLAKE and Norbert RO__"SLER, and International Publication No. WO 97/37387 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The corresponding foreign and international patent publication applications, namely, Fed. Rep. of Germany Patent Application No. 196 12 488.3, filed on Mar. 29, 1996, and International Application No. PCT/DE97/00646, filed on Mar. 27, 1997, having inventors Manfred RINKLAKE and Norbert RO__"SLER, and International Publication No. WO 97/37091 published on Oct. 9, 1997, as well as their published equivalents, and other equivalents or corresponding applications, if any, in corresponding cases in Fed. Rep. of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A joist element, said joist element being configured to fasten a substantially flat plate-shaped structural element to a pitched roof, the pitched roof having an upper ridge portion disposed adjacent the roof peak and an eaves portion disposed below the roof peak, which ridge portion and eaves portion define a slope line in a ridge-eaves direction, said joist element comprising:

a beam having a longitudinal axis;

said beam being configured to be disposed longitudinally in the ridge-eaves direction;

said beam having an upper surface defining a support plane for supporting a said substantially flat plate-shaped structural element on said upper surface;

a lug disposed on said beam;

said lug being configured to engage and support another joist element, upon the another joist element being disposed above said joist element in substantially the same slope line as said joist element, said lug allowing lengthwise sliding movement of the another joist element; and said lug being configured to support the another joist element at a height substantially spaced above said support plane.

2. The joist element according to claim 1, wherein:

said beam has said upper surface disposed substantially opposite a lower side, and a ridge-end portion disposed substantially opposite an eaves-end portion; and said lug is disposed to extend from said upper surface of said ridge-end portion.

3. The joist element according to claim 2, wherein said beam and said lug are formed as separate components.

4. The joist element according to claim 3, wherein said lug comprises locking connection elements to connect said lug to the beam of another joist element.

5. The joist element according to claim 4, wherein:

said beam has a slot disposed in said lower side and at least in part in said eaves-end portion; and said lug comprises a toggle-like extension portion having side wings separated from the main part of the structure by slots which define a neck, said neck being configured for slidingly engaging in a slot of another joist element.

6. The joist element according to claim 5, wherein:

said beam is configured substantially in the form of a thin-walled profile.

7. A joist element configured to fasten a substantially flat plate-shaped structural element to a pitched roof, the pitched roof having an upper ridge portion disposed adjacent the roof peak and an eaves portion disposed below the roof peak, which ridge portion and eaves portion define a slope line in a ridge-eaves direction, said joist element comprising:

a beam having a longitudinal axis and configured to be disposed longitudinally in the ridge-eaves direction;

said beam having an upper surface defining a support plane for supporting a substantially flat plate-shaped structural element on said upper surface;

said beam having said upper surface disposed substantially opposite a lower side, and a ridge-end portion disposed substantially opposite an eaves-end portion;

a lug disposed on said beam, said lug being disposed to extend from said upper surface of said ridge-end portion, said beam and said lug being formed as separate components;

said lug being configured to slidingly engage and-support another joist element, upon the another joist element being disposed above said joist element in substantially the same slope line as said joist element at a height substantially spaced above said support plane;

wherein said beam is configured substantially in the form of a thin-walled profile and has a slot disposed in said lower side and least in part in said eaves-end portion;

said lug comprising a toggle-like extension portion configured for slidingly engaging in said slot of said identical support element;

said joist element having a hook-shaped receptacle;

said receptacle being disposed on said eaves-end portion; and said receptacle being configured to receive an edge of the structural element to be supported by said beam.

8. The joist element according to claim 7, wherein the structural element to be supported by said joist element has a length dimension, and wherein:

said receptacle comprises a hook-portion;

said hook-portion having a first length dimension;

said receptacle comprises a base portion;

said base portion of said receptacle, on said eaves-end portion, being disposed a second length dimension from the lug on the ridge-end portion; and said second length dimension being greater than the length of the structural element to be supported, by at least the first length dimension of said hook portion.

9. The joist element according to claim 8, wherein:

said joist element has a projection extending from said lower side of said ridge-end portion;

said projection is configured to permit said joist element to be hung from the substructure of the roof;

said ridge-end portion of said beam comprises a bearing;

said bearing is configured to receive a fastening element to permit the fastening of said joist element to the substructure of the roof.

10. A joist element for fastening an energy collection module to a pitched roof, having an upper ridge portion disposed adjacent the roof peak and an eaves portion disposed below the roof peak, which ridge portion and eaves portion define a slope line in a ridge-eaves direction, said joist element comprising:

a beam having a longitudinal axis and configured to be disposed longitudinally in the ridge-eaves direction;

said beam having an upper surface defining a support plane for supporting a substantially an energy collection module on said upper surface;

said beam having said upper surface disposed substantially opposite a lower side, and a ridge-end portion disposed substantially opposite an eaves-end portion;

a lug disposed on said beam, said lug being disposed to extend from said upper surface of said ridge-end portion, said beam and said lug being formed as separate components;

said lug being configured to slidingly engage and support another joist element, upon the another joist element being disposed above said joist element in substantially the same slope line as said joist element at a height substantially spaced above said support plane;

wherein said beam is configured substantially in the form of a thin-walled profile and has a slot disposed in said lower side and least in part in said eaves-end portion;

said lug comprising a toggle-like extension portion configured for slidingly engaging in said slot of said identical support element;

said joist element having a hook-shaped receptacle;

said receptacle being disposed on said eaves-end portion; and said receptacle being configured to grip the module supported by said beam.

11. The joist element according to claim 10, wherein the photovoltaic module to be supported by said support element has a length dimension of 31 to 34 cm., and wherein:

said receptacle comprises a hook-portion;

said hook-portion having a first length dimension;

said receptacle comprises a base portion;

said base portion of said receptacle, on said eaves-end portion, being disposed a second length dimension from said lug on said ridge-end portion; and said second length dimension being greater than said length dimension of the photovoltaic module to be supported, by at least the first length dimension of said hook portion.

12. The joist element according to claim 11, wherein:

said joist element has a projection extending from said lower side of said ridge-end portion;

said projection is configured to permit said joist element to be hung from the substructure of the roof;

said ridge-end portion of said beam comprises a bearing; and said bearing is configured to receive a fastening element to permit the fastening of said joist element to the substructure of the roof.

13. A joist element for fastening an energy collection module to a pitched roof, the pitched roof having an upper ridge portion disposed adjacent the roof peak and an eaves portion disposed below the roof peak, which ridge portion and eaves portion define a slope line in a ridge-eaves direction, said joist element comprising:

a beam having a longitudinal axis;

said beam being configured to be disposed longitudinally in the ridge-eaves direction;

said beam having an upper surface defining a support plane for supporting an energy collection module on said upper surface;

a lug disposed on said beam;

said lug being configured to engage and support another joist element, upon the another joist element being disposed above said joist element in substantially the same slope line as said joist element, said lug allowing lengthwise sliding movement of the another joist element; and said lug being configured to support the another joist element at a height sufficiently above said beam support plane to permit the another joist element to be displaced, in the ridge-eaves direction, above a top surface of an energy collection module supported by said upper surface of said beam of said joist element.

14. The joist element according to claim 13, wherein:

said beam has said upper surface disposed substantially opposite a lower side, and a ridge-end portion disposed substantially opposite an eaves-end portion; and said lug is disposed to extend from said upper surface of said ridge-end portion.

15. The joist element according to claim 14, wherein said beam and said lug are formed as separate components.

16. The joist element according to claim 15, wherein said lug comprises locking connection elements to connect said lug to the beam of said another joist element.

17. The joist element according to claim 16, wherein:
   said beam has a slot disposed in said lower side and at least in part in an eaves-end portion; and
   said lug comprises a toggle-like extension portion having side wings separated from the main part of the structure by slots which define a neck, said neck being configured for slidingly engaging in said slot of said identical joist element.

18. The joist element according to claim 17, wherein said beam is configured substantially in the form of a thin-walled profile.

* * * * *

UNITED STATES PATENT AND TRADEMARK OFFICE
CERTIFICATE OF CORRECTION

PATENT NO.  : 6,105,331
DATED       : August 22, 2000
INVENTOR(S) : Manfred Rinklake and Norbert Rősler It is certified that error appears in the above-identified patent and that said Letters Patent is hereby corrected as shown below:

Column 3
Line 16, after 'profile.', delete "Preferable," and insert -- Preferably, --.

Column 5,
Line 42, after 'neck', delete "36 and" and insert -- 36.-- .
Line 43, before 'A', delete "the wall in the vicinity of the upper edge of the toggle."

Column 10,
Line 11, after 'channel', delete "88." and insert -- 98. --.
Line 40, after 'element', delete "73." and insert -- 72. --.

Column 11,
Line 29, after 'FIG. 5', insert -- also --.

Column 12,
Line 7, after "module', delete "44." and insert -- 40. --.

Column 13,
Line 47, after 'side,', delete "there" and insert -- their -- .

Column 19,
Line 27, after 'Norbert', delete "RO_"SLER," and insert -- RŐSLER, --.
Line 40, after 'Norbert', delete "RO_"SLER," and insert -- RŐSLER, --.

Column 17,
Line 52, after "Norbert", delete "RO_"SLER," and insert -- RŐSLER, --.

Signed and Sealed this

Thirtieth Day of October, 2001

Attest:

*Attesting Officer*

NICHOLAS P. GODICI
*Acting Director of the United States Patent and Trademark Office*